US012785510B2

(12) United States Patent
Sonntag et al.

(10) Patent No.: US 12,785,510 B2
(45) Date of Patent: Nov. 3, 2026

(54) ELECTRICAL MACHINE

(71) Applicant: Schaeffler Technologies AG & Co. KG, Herzogenaurach (DE)

(72) Inventors: Carsten Sonntag, Gauting-Königswiesen (DE); Stefan Riess, Kaufering (DE); Michael Menhart, Igling (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 395 days.

(21) Appl. No.: 18/554,518

(22) PCT Filed: Apr. 8, 2022

(86) PCT No.: PCT/DE2022/100265
§ 371 (c)(1),
(2) Date: Oct. 9, 2023

(87) PCT Pub. No.: WO2022/214143
PCT Pub. Date: Oct. 13, 2022

(65) Prior Publication Data

US 2024/0195268 A1 Jun. 13, 2024

(30) Foreign Application Priority Data

Apr. 10, 2021 (DE) ........................ 102021108952.2

(51) Int. Cl.
*H02K 9/197* (2006.01)

(52) U.S. Cl.
CPC .................................... *H02K 9/197* (2013.01)

(58) Field of Classification Search
CPC ...... H02K 9/197; H02K 1/2796; H02K 7/006; H02K 5/225; H02K 1/182; H02K 1/2793; H02K 21/24; H02K 37/08; H02K 37/125
(Continued)

(56) References Cited

U.S. PATENT DOCUMENTS

| | | | | |
|---|---|---|---|---|
| 3,050,645 A | 8/1962 | Redding, Jr. | | |
| 2010/0216332 A1* | 8/2010 | Garriga .................... | H01R 4/34 | 439/814 |

(Continued)

FOREIGN PATENT DOCUMENTS

| | | |
|---|---|---|
| CN | 1294770 A | 5/2001 |
| CN | 112534682 A | 3/2021 |

(Continued)

OTHER PUBLICATIONS

JP 2016192851 (Year: 2016).*

(Continued)

*Primary Examiner* — Ahmed Elnakib
(74) *Attorney, Agent, or Firm* — Volpe Koenig

(57) ABSTRACT

An electrical machine having a rotor mounted rotatably relative to a stator, the rotor has a rotor shaft with a rotor body mounted thereon for rotation and displacement there-with. The stator has a stator body with a first stator winding arranged within a first hydraulic space, within which the first stator winding can be contacted at least in sections by a hydraulic fluid. An electrical conductor of the first stator winding emerges in the axial direction from the first stator body and reaches through a partition, and a leadthrough element is arranged in the partition, with the electrical conductor (reaching through the leadthrough element to form a hydraulic barrier between the hydraulic fluid on the side of the partition facing the stator body and the hydraulic fluid on the side of the partition facing away from the stator body.

18 Claims, 5 Drawing Sheets

(58) Field of Classification Search
USPC .................................................... 310/54, 71
See application file for complete search history.

(56) References Cited

U.S. PATENT DOCUMENTS

| | | | | |
|---|---|---|---|---|
| 2012/0169509 | A1* | 7/2012 | Coulston ................. | E21B 47/12 340/853.1 |
| 2015/0333602 | A1* | 11/2015 | Mohr ..................... | H02K 5/203 310/68 B |
| 2024/0195267 | A1* | 6/2024 | Riess ..................... | H02K 16/04 |
| 2024/0195268 | A1* | 6/2024 | Riess ..................... | H02K 5/225 |
| 2024/0204609 | A1* | 6/2024 | Riess ..................... | H02K 5/225 |
| 2024/0204621 | A1* | 6/2024 | Riess ..................... | H02K 9/197 |

FOREIGN PATENT DOCUMENTS

| | | | |
|---|---|---|---|
| DE | 102015013018 | | 4/2017 |
| DE | 102019107516 | | 12/2019 |
| DE | 102019126499 | | 4/2021 |
| EP | 3157138 | | 7/2018 |
| FR | 1127320 | A | 12/1956 |
| JP | 2002191148 | A | 7/2002 |
| JP | 2006050752 | A | 2/2006 |
| JP | 2012244700 | A | 12/2012 |
| WO | 2001011755 | | 2/2001 |
| WO | 2018048086 | | 3/2018 |
| WO | 2019241765 | | 12/2019 |

OTHER PUBLICATIONS

Erik Schneider, Frank Fickl, Bernd Cebulski and Jens Liebold with the title: “Hochintegrativ und Flexibel Elektrische Antriebseinheit für E-Fahrzeuge” [Highly integrative and flexible electric drive unit for e-vehicles], ATZ magazine, vol. 113, pp. 360-365, May 2011.
Markus Schiefer: Indirekte Wicklungskühlung von hochausgenutzten permanenterregten Synchronmaschinen mit Zahnspulenwicklung [Indirect Winding Cooling of Highly Utilized Permanently Excited Synchronous Machines with Toothed Coil Winding], dissertation, Karlsruhe Institute of Technology (KIT), (2017).

* cited by examiner

ELECTRICAL MACHINE

CROSS-REFERENCE TO RELATED APPLICATIONS

This application is the U.S. National Phase of PCT Appln. No. PCT/DE2022/100265, filed Apr. 8, 2022, which claims priority from German Patent Application No. 10 2021 108 952.2, filed Apr. 10, 2021, the entire disclosures of which are incorporated by reference herein.

TECHNICAL FIELD

The present disclosure relates to an electrical machine comprising a rotor rotatably mounted relative to a stator, wherein the rotor has a rotor shaft with at least one rotor body arranged in a non-rotatable and non-displaceable manner on the rotor shaft, wherein the stator has a stator body with a first stator winding, wherein the first stator winding is arranged within a first hydraulic chamber, within which the first stator winding can be contacted at least in sections by a hydraulic fluid.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, 05/2011, pages 360-365 by Erik Schneider, Frank Fickl, Bernd Cebulski and Jens Liebold with the title: *Hochintegrativ und Flexibel Elektrische Antriebseinheit für E-Fahrzeuge* [Highly Integrative and Flexible Electric Drive Unit for E-Vehicles]. This article describes a drive unit for an axle of a vehicle, which comprises an electric motor that is arranged concentrically and coaxially with a bevel gear differential, wherein a switchable 2-speed planetary gear set is arranged in the drive train between the electric motor and the bevel gear differential, which is also positioned coaxially to the electric motor or the bevel gear differential or spur gear differential. The drive unit is very compact and allows for a good compromise between climbing ability, acceleration and energy consumption due to the switchable 2-speed planetary gear set. Such drive units are also referred to as e-axles or electrically operable drive trains.

In addition to purely electrically operated drive trains, hybrid drive trains are also known. Such drive trains of a hybrid vehicle usually comprise a combination of an internal combustion engine and an electric motor, and enable—for example in urban areas—a purely electric mode of operation with both sufficient range and availability, in particular when driving overland. In addition, there is the possibility of driving the internal combustion engine and the electric motor at the same time in certain operating situations.

In the development of electrical machines intended for e-axles or hybrid modules, there exists a continuing need to increase their power densities, so that the cooling of the electrical machines required for this is becoming increasingly important. Due to the necessary cooling capacities, hydraulic fluids such as cooling oils have become established in most concepts for the removal of heat from the thermally loaded areas of an electrical machine.

The methods of jacket cooling as well as winding head cooling are known from the prior art for implementing a cooling solution for electrical machines by means of hydraulic fluids, for example. While jacket cooling transfers the heat generated on the outer surface of the laminated core of the stator into a cooling circuit, with winding head cooling, the heat transfer takes place directly on the conductors outside the laminated core of the stator in the region of the winding heads into the fluid.

Further improvements are provided by separate cooling channels, which are introduced both into the laminated core of the stator (see, for example, EP3157138 A1) and into the groove in addition to the conductors (see, for example, Markus Schiefer: *Indirekte Wicklungskühlung von hochausgenutzten permanenterregten Synchronmaschinen mit Zahnspulenwicklung* [Indirect Winding Cooling of Highly Utilized Permanently Excited Synchronous Machines with Toothed Coil Winding], dissertation, Karlsruhe Institute of Technology (KIT), 2017).

Concepts are also known in which hydraulic fluid flows directly around the windings in order to increase the power density. An improved cooling with direct contact of the hydraulic fluid and conductor in the groove is already known per se from the prior art. For example, DE102015013018 A1 describes a solution for electrical machines with single tooth winding, wherein the fluid flows directly around the windings, which are wound around the teeth.

For a defined coolant guidance, it can be necessary in such electrical machines that the electrical conductor of a winding and the coolant flow are guided separately, so that no relevant cross-flow or pressure loss across the separation is present or arises for the application.

SUMMARY

The object of the disclosure is to provide an electrical machine which has a high power density due to optimized cooling and optimized electromagnetic design as well as safe electrical and hydraulic guidance. Furthermore, it is the object of the disclosure that the electrical machine can be manufactured cost-effectively and is designed to be easy to assemble.

This object is achieved by an electrical machine comprising a rotor rotatably mounted relative to a stator, wherein the rotor has a rotor shaft with at least one rotor body arranged in a non-rotatable and non-displaceable manner on the rotor shaft, wherein the stator has a stator body with a first stator winding, wherein the first stator winding is arranged within a first hydraulic chamber, within which the first stator winding can be contacted at least in sections by a hydraulic fluid, wherein at least one electrical conductor of the first stator winding emerges in the axial direction from the first stator body and reaches through a partition wall, wherein a feed-through element is arranged in the partition wall with the at least one electrical conductor reaching through the feed-through element in such a manner that a hydraulic barrier is formed between the hydraulic fluid on the side of the partition wall facing the stator body and the hydraulic fluid on the side of the partition wall facing away from the stator body.

Preferably, the hydraulic fluid has a first temperature level T1 on the side of the partition wall facing the stator body and a second temperature level T2 on the side of the partition wall facing away from the stator body, wherein preferably the first temperature level T1 is different from the second temperature level T2.

The feed-through element thus ensures in particular that, when the electrical conductor and hydraulic fluid are guided separately, an electrical conductor is positioned therein, the requirements for electrical insulation with regard to clearance and creepage distances are fulfilled and, at the same time, the remaining flow cross-section is constricted or sealed in such a way that a hydraulic barrier is formed which allows for a cross-flow or pressure drop between the electrical conductor and the feed-through element which is necessary or permissible for the application to pass or occur.

The feed-through element is thus designed for the uninterrupted local accommodation and guidance of at least one electrical conductor and for the local constriction of the flow cross-section of the cooling circuit to form a hydraulic barrier. In this regard, the feed-through element can accommodate individual conductors or multiple electrical conductors individually or collectively.

The feed-through element blocks the flow cross-section, forming a hydraulic barrier. In this regard, the hydraulic barrier can be designed to be completely sealing or it can allow a cross-flow of hydraulic fluid through the hydraulic barrier that is permissible for the application. Preferably, the cross-flow can also be shut off to such an extent that this only results in an insignificant pressure drop in the hydraulic system for the application. The cross-flow can be adjusted, for example, via a defined circumferential gap between the feed-through element and each electrical conductor by means of a compression between the sealing element and the electrical conductor or by means of additional sealing elements and sealing means. For this purpose, the sealing element can be made of a material suitable for the application, for example an elastomer, engineering plastic or engineering ceramic. The material can also preferably be used to ensure that the clearance and creepage distances are increased or maintained. The additional sealing means or sealing elements can be used in particular to reduce or adjust the sealing effect and thus the cross-flow via the feed-through element.

First, the individual elements of the subject matter of the disclosure are explained in the order in which they are named in the claims and particularly preferred embodiments of the subject matter according to the disclosure are described below.

Electrical machines are used to convert electrical energy into mechanical energy and/or vice versa, and generally comprise a stationary part referred to as a stator, stand or armature, and a part referred to as a rotor or runner and arranged movably relative to the stationary part. In the case of electrical machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. The electrical machine according to the disclosure can be designed as an axial flux machine or radial flux machine.

The stator of the electrical machine can in particular be designed as a stator for a radial flux machine. The stator of a radial flux machine usually has a cylindrical structure and preferably consists of electrical laminations that are electrically insulated from one another and are structured in layers and packaged to form laminated cores. Distributed over the circumference, grooves and/or channels can be embedded into the electrical lamination running parallel to the rotor shaft, and can accommodate the stator winding or parts of the stator winding. The stator designed for a radial flux machine can be designed as a stator for an internal rotor or external rotor. In an internal rotor, for example, the stator teeth extend radially inwards, whereas in an external rotor they extend radially outwards.

The electrical machine according to the disclosure is intended in particular for use within a drive train of a hybrid or fully electric motor vehicle. In particular, the electrical machine is dimensioned such that vehicle speeds of more than 50 km/h, preferably more than 80 km/h and in particular more than 100 km/h can be achieved. The electrical machine particularly preferably has an output of more than 30 KW, preferably more than 50 KW and in particular more than 70 kW. Furthermore, it is preferred that the electrical machine provides speeds greater than 5,000 rpm, particularly preferably greater than 10,000 rpm, very particularly preferably greater than 12,500 rpm.

A stator winding is an electrically conductive conductor whose longitudinal extension is considerably greater than its extension perpendicular to the longitudinal extension. The stator winding can generally have any cross-sectional shape. Rectangular cross-sectional shapes are preferred, as these allow for high packing densities and consequently high power densities to be achieved. Particularly preferably, a stator winding is formed of copper. Preferably, a stator winding has an insulation. To insulate the stator winding, for example, mica paper, which for mechanical reasons can be reinforced by a glass fabric bearer, may be wound in tape form around one or more stator windings, which are impregnated by means of a curing resin. In principle, it is also possible to use a curable polymer or a varnish layer without a mica paper to insulate a stator winding.

According to an advantageous embodiment, the electrical machine can be designed as an axial flux machine, comprising the rotor rotatably mounted relative to the stator in a dry chamber, wherein the rotor has the rotor shaft with at least the first rotor body which is designed to be disc-shaped and is arranged in a non-rotatable and non-displaceable manner on the rotor shaft, wherein the stator comprises the first annular disc-shaped stator body and the second annular disc-shaped stator body, which are arranged coaxially with respect to one another and with respect to the rotor shaft and are axially spaced apart from one another with the interposition of the rotor. The advantage of this design is that the electrical machine can be designed to be axially very compact.

The magnetic flux in such an electrical axial flux machine (AFM), such as an electric driving machine of a motor vehicle designed as an axial flux machine, is directed axially to a direction of rotation of the rotor of the axial flux machine in the air gap between the stator and the rotor. Different types of axial flux machines exist. One known type is what is termed an I arrangement, in which the rotor is arranged so as to be axially adjacent to a stator or between two stators. Another known type is what is termed an H arrangement, in which two rotors are arranged on opposite axial sides of a stator. In the context of the present disclosure, an I arrangement is preferred.

It is also preferable that the winding ends of the axial flux machine run in such a way that, when assembled, the winding ends are oriented parallel or approximately parallel to the main machine axis. During assembly, the winding ends are preferably guided to one of the end faces of the axial flux machine through local clearances provided for this purpose and formed accordingly, and are suitably connected electrically and mechanically after the corresponding machine parts have been pushed together axially. In a particularly preferred manner, the winding ends of the stators connected in this way are guided to the axially positioned phase connections via connecting conductors on the end face. These connecting conductors can be seamlessly connected to the winding by winding ends or be suitably electrically and mechanically connected to the winding. The star point(s) of the machine is/are preferably not provided up to the phase connection.

The electrical machine can preferably also comprise a hydraulic connecting element which hydraulically connects the first hydraulic chamber to the second hydraulic chamber, wherein at least one electrical conductor of the first stator winding and/or the second stator winding is arranged within the hydraulic connecting element. The hydraulic connecting element can have any closed cross-sectional geometry and can, for example, be designed as a tube or a hose for bridging one or more parting lines between a first hydraulic chamber of a first stator body and a second hydraulic chamber of a second stator body. This hydraulic connecting element also ensures that the electrical conductor of a stator winding is guided in it and that, at the same time, the coolant flows around it. In this regard, a suitable selection of the material of the hydraulic connecting element and a corresponding wall thickness can, at the same time, achieve an electrical insulation effect with respect to electrically conductive housing parts. Preferably, the hydraulic connecting element can be plugged into or inserted in present openings. In addition, the hydraulic connecting element can be used to adjust clearance and creepage distances within the electrical machine.

In this regard, the sealing effect of the hydraulic connecting element with respect to adjacent housing parts can be achieved, for example, by a defined gap between the sealing element and the housing by pressing the hydraulic connecting element in the sealing region with adjacent housing parts or via a separate sealing element or a sealant. The sealing element can, in this regard, preferably also be integrated into the hydraulic connecting element for the sealed and electrically insulated passage.

According to an advantageous embodiment, the first hydraulic chamber can be enclosed at least in sections by a delimiting first housing component which has a plurality of circumferentially distributed openings for the passage of the second winding ends.

According to another preferred further development according to the disclosure, the first winding ends can also be arranged on a circular path having a first diameter and the second winding ends can be arranged on a circular path having a second diameter, wherein the first diameter is different from the second diameter. This can be used to ensure that the winding ends do not contact one another unintentionally.

Furthermore, according to a likewise advantageous embodiment according to the disclosure, the first winding ends and the second winding ends can be oriented towards the same axial end face of the axial flux machine. According to another particularly preferred embodiment, the first winding ends and the second winding ends can be interconnected at the same axial end face of the axial flux machine, whereby the assembly effort can be further reduced.

Furthermore, the disclosure can also be further developed in that the first stator winding and the second stator winding are each configured to be at least three-phase with a star point connection.

To provide an electrical contact between a wet chamber and a dry chamber of the electrical machine, at least one electrical connection element can particularly preferably be provided. For this purpose, the electrical connection element has a contacting body which is fixed in a receiving sleeve by means of a press fit. In particular, a bolt pressed into the receiving sleeve or a threaded bushing can be used as a contacting body, the main function of which is to support the clamping forces, for example via the load-bearing cross-section and an undercut. The material of the bolt or the threaded bushing advantageously has a higher mechanical load capacity (yield point) than the material of the receiving sleeve. On its part, the receiving sleeve preferably has a higher specific electrical conductivity compared to the contacting body. In contrast, the material of the receiving sleeve is softer and therefore has a lower mechanical load capacity (yield point) than the material of the contacting body.

The contacting body, designed as a bolt or threaded bushing, is preferably pressed into the housing component in such a way that the softer material is elastically and plastically deformed so that the sealing effect is sufficient in order to seal the two chambers on both sides of the housing component from one another or one chamber from the environment. For this purpose, a cross-sectional widening is preferably provided on the contacting body, for example on the bolt or threaded bushing, which is designed for the forming of the softer material. In this regard, the elastic part of the forming ensures that the contact pressure is maintained and the plastic part of the forming extends the sealing distances in the region intended for this purpose. Excess material of the counterpart is, in this regard, received in a region intended for this purpose. At the same time, the cross-sectional widening of the contacting body, for example the bolt or threaded bushing, creates an undercut that counteracts the removal of the receiving sleeve. The space for receiving the excess material during the press-in process can, in a preferable manner, also be equipped with additional sealing means or sealing elements and thus further increase the sealing effect.

The receiving sleeve with the pressed-in contacting body, for example the bolt or threaded bushing, is particularly preferably mounted in the housing component in an electrically insulated manner. For this purpose, for example, either the housing component can be made of an electrically poorly conducting material or an insulating material, or it can be inserted into an electrically non-conducting adapter that realizes the electrical insulation effect between the housing component and the assembly consisting of the contacting body and receiving sleeve. The sealing effect can be achieved, for example, by means of sealing elements between the receiving sleeve and the adjacent housing component or adapter.

According to an advantageous embodiment, a plurality of electrical conductors can reach through the feed-through element.

According to a further preferred further development, the hydraulic barrier can be designed as a seal. Furthermore, according to an equally advantageous embodiment, the hydraulic barrier can be designed as a choke which has a gap with the electrical conductor so that a predefined cross-flow of hydraulic fluid can be adjusted.

According to another particularly preferred embodiment, a hydraulic barrier can be provided in each case in the feed-through element for each electrical conductor, whereby the sealing effect can be further optimized.

Furthermore, the disclosure can also be further developed in that the feed-through element is formed from a plastic, in particular an elastomer.

In a likewise preferred embodiment, the feed-through element can be held in the partition wall by means of a press fit. Alternatively or additionally, the feed-through element can be provided with a form-fit means which provides a form-fitting fixation of the feed-through element on the partition wall with a corresponding form-fit means on the partition wall. The form-fit means can, for example, form a snap connection, a snap-lock connection or the like. For this purpose, the feed-through element can, for example, have an undercut which effects a form fit with a corresponding partition wall. In principle, it would also be conceivable in this context that the feed-through element is arranged in the partition wall with play.

It can also be advantageous to develop the disclosure further in that the feed-through element is of plug-like design with a circumferential collar which rests against the partition wall, so that a defined position of the feed-through element relative to the partition wall can be defined.

According to a further preferred embodiment of the subject matter disclosed herein, the partition wall can form the bottom of a conductor channel in which the conductors are guided in the circumferential direction and over which the hydraulic fluid flows.

Finally, the disclosure can also be advantageously developed in that the electrical machine is designed as an axial flux machine, with the rotor rotatably mounted relative to the stator in a dry chamber, wherein the rotor has the rotor shaft with at least one first rotor body which is designed to be disc-shaped and is arranged in a non-rotatable and non-displaceable manner on the rotor shaft, and the stator comprises a first annular disc-shaped stator body and a second annular disc-shaped stator body, which are arranged coaxially with respect to one another and with respect to the rotor shaft and are axially spaced apart from one another with the interposition of the rotor, and the first stator body has a first stator winding and the second stator body has a second stator winding, wherein the first stator winding is arranged within a first hydraulic chamber and the second stator winding is arranged within a second hydraulic chamber, within which the respective stator windings can each be contacted at least in sections by a hydraulic fluid.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
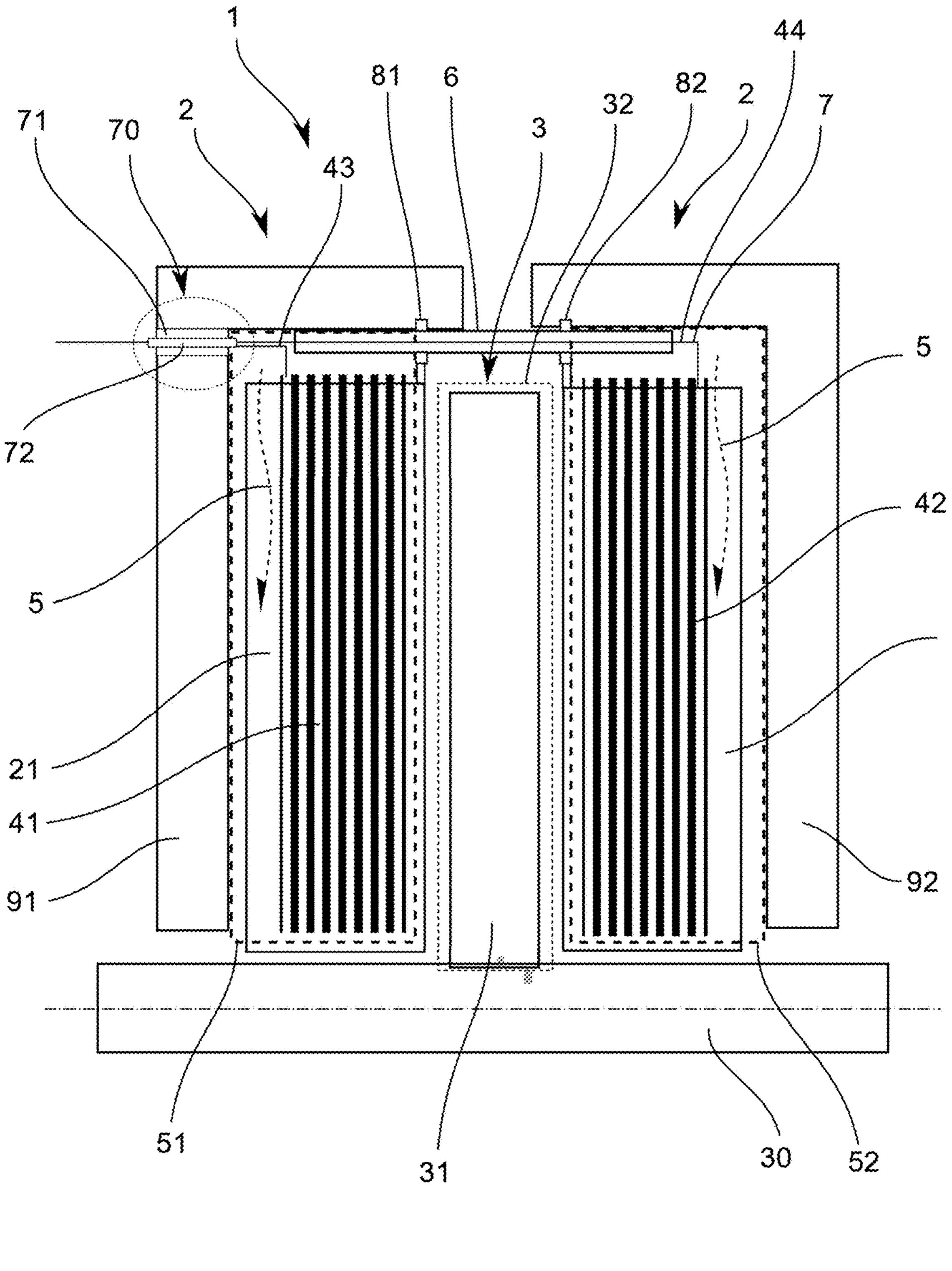
FIG. 1 shows an electrical axial flux machine in a schematic axial sectional view.
Figure 3:
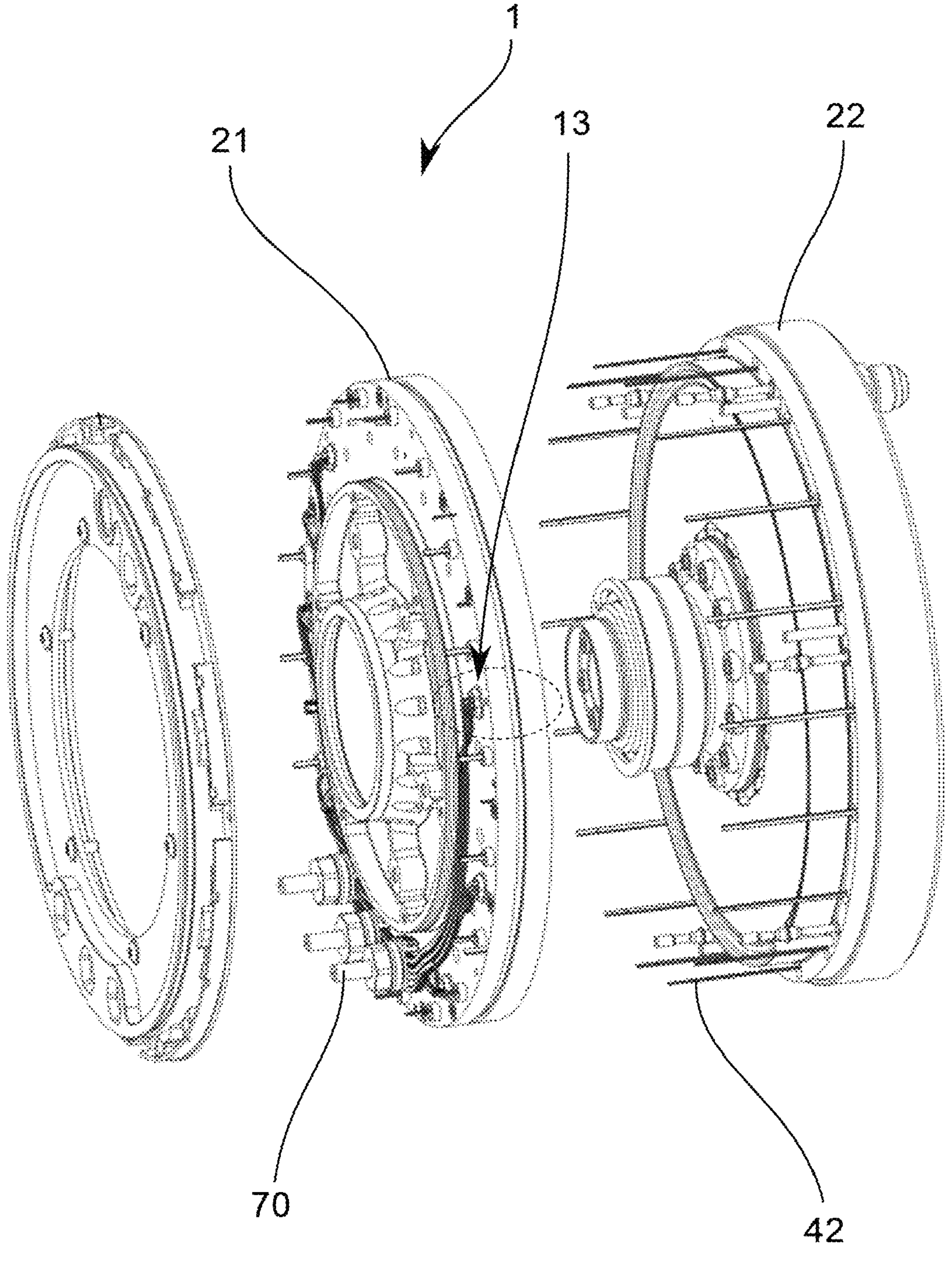
FIG. 3 shows an electrical axial flux machine in a perspective exploded view.

FIG. 1 shows an electrical axial flux machine 1 for an electrically operated drive train 10 of a motor vehicle 11, as shown by way of example in FIG. 3. The upper illustration of FIG. 3 shows the drive train 10 of a hybrid-driven motor vehicle and the lower illustration of a fully electrically driven motor vehicle 11 with one electrical machine 1 each.

The electrical machine 1 comprises a rotor 3 rotatably mounted relative to a stator 2, wherein the rotor 3 has a rotor shaft 30 with at least one rotor body 31 arranged in a non-rotatable and non-displaceable manner on the rotor shaft 30. The stator 2 has a stator body 21 with a first stator winding 41, wherein the first stator winding 41 is arranged within a first hydraulic chamber 51, within which the first stator winding 41 can be contacted at least in sections by a hydraulic fluid 5.

In the exemplary embodiment shown, the electrical machine is designed as an axial flux machine 1, with the rotor 2 rotatably mounted relative to the stator 3 in a dry chamber 32, wherein the rotor 3 has the rotor shaft 30 with at least a first rotor body 31 which is designed to be disc-shaped and is arranged in a non-rotatable and non-displaceable manner on the rotor shaft 30, and the stator 2 comprises a first annular disc-shaped stator body 21 and a second annular disc-shaped stator body 22, which are arranged coaxially with respect to one another and with respect to the rotor shaft 30 and are axially spaced apart from one another with the interposition of the rotor 3.

The first stator body 21 has a first stator winding 41 and the second stator body 22 has a second stator winding 42, wherein the first stator winding 41 is arranged within a first hydraulic chamber 51 and the second stator winding 42 is arranged within a second hydraulic chamber 52, within which the respective stator windings 41, 42 can each be contacted at least in sections by a hydraulic fluid 5.

The first stator winding 41 has first winding ends 43 emerging from the first stator body 21, which extend radially above the stator body 21 in the axial direction. The second stator winding 42 has second winding ends 44 emerging from the second stator body 22, which extend radially above the first stator body 21 and the second stator body 22 in the axial direction. Looking at FIG. 1 and FIG. 2 together, it can be seen that the first hydraulic chamber 51 is enclosed at least in sections by a delimiting first housing component 91 which has a plurality of circumferentially distributed openings 13, 14 for the passage of the second winding ends 44.

The first winding ends 43 are arranged on a circular path having a first diameter and the second winding ends 44 are arranged on a circular path having a second diameter, wherein the first diameter is different from the second diameter.

The first winding ends 43 and the second winding ends 44 are oriented towards the same axial end face of the axial flux machine 1 and are interconnected at the same axial end face of the axial flux machine 1. The first stator winding 41 and the second stator winding 42 are each configured to be at least three-phase with a star point connection.

The electrical machine 1 further comprises a plurality of hydraulic connecting elements 6 which hydraulically connect the first hydraulic chamber 51 to the second hydraulic chamber 52. At least one electrical conductor 7 of the second stator winding 42 is arranged in each case within the hydraulic connecting elements 6. The plurality of substantially identically designed hydraulic connecting elements 6 is arranged in a circumferentially distributed manner between the first hydraulic chamber 51 and the second hydraulic chamber 52.

The hydraulic connecting element 6 is formed from an electrically non-conductive material and has a substantially cylindrical ring-like spatial shape.

In the embodiment shown, the hydraulic connecting elements 6 are positioned radially above the first stator body 21 and the second stator body 22.

FIG. 1 further shows that one hydraulic connecting element 6 has a first seal 81 in each case, which seals the first hydraulic chamber 51 with respect to the dry chamber 32 of the rotor 2 and the hydraulic connecting element 6 has a second seal 82, which seals the second hydraulic chamber 52 with respect to the dry chamber 32 of the rotor 2. The first seal 81 and the second seal 82 are designed as sealing rings in the exemplary embodiment shown.

The hydraulic connecting elements 6 are each connected by means of a press fit to a first housing component 91 delimiting the first hydraulic chamber 51 at least in sections and to a second housing component 92 delimiting the second hydraulic chamber 52 at least in sections.

An electrical connection element 70 is arranged in the first housing component 91, which has an electrical contacting body 71 which extends through the housing component 91 in such a way that a first cylindrical section 72 of the contacting body 71 projects into the first hydraulic chamber 51 and a second cylindrical section 77 of the contacting body 71 can be contacted from the side of the first housing component 91 facing away from the first hydraulic chamber 51. The contacting body 71 is fixed in a receiving sleeve 73 by means of a circumferentially closed press fit, which in turn is received in the first housing component 91 by means of a press fit. The first section 72 of the contacting body 71 is formed as a bolt, in particular a threaded bolt. Alternatively, it would also be possible for the first section 72 of the contacting body 71 to be designed as a bushing, in particular a threaded bushing. The contacting body 71 runs in its longitudinal extension axially parallel to the axis of rotation of the rotor 30.

The electrical connection element 70 is connected in the direction of the first or second hydraulic chamber 51,52 to one or more of the electrical conductors 7 of the stator windings 41, 42. In particular, electrical conductors 7 of the same phase can be connected to an electrical connection element 70. This is the case in the exemplary embodiment shown in FIG. 1. The first winding ends 43 of the first stator winding 41 and the second winding ends 42 of the second stator winding 42 assigned to the same phase are electrically as well as mechanically connected to the contacting body 71 of the electrical connection element 70. The connection of an electrical conductor to the first section 72 of the contacting body 71 can be made, for example, by means of soldering or welding, or by means of a detachable connection, such as with a clamp.

Figure 2:
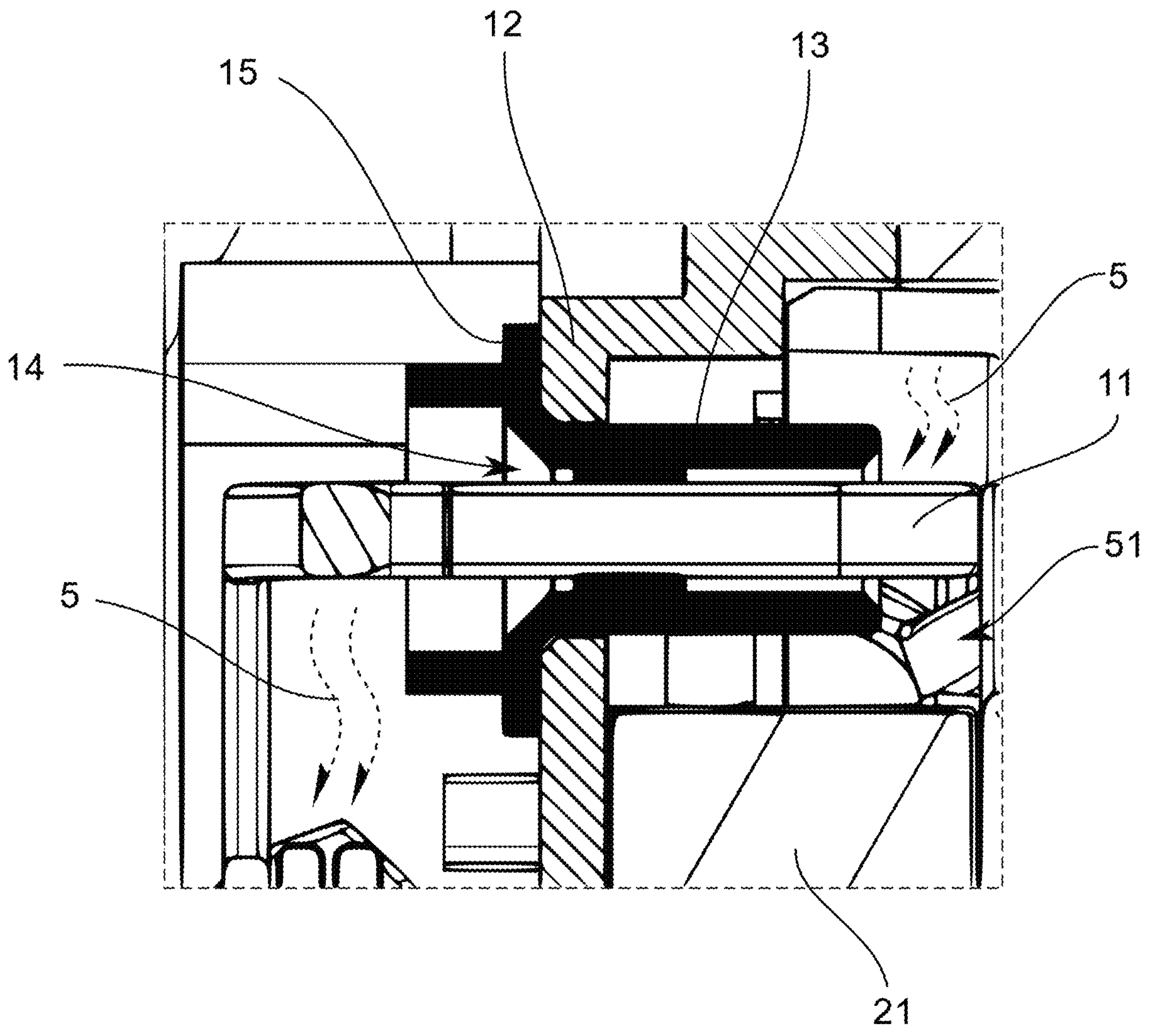
FIG. 2 shows a detailed view of the feed-through element in a schematic sectional view.

As can be seen from FIG. 2, at least one electrical conductor 11 of the first stator winding 41 emerges in the axial direction from the first stator body 21 and reaches through a partition wall 12, wherein on the side of the partition wall 12 facing the stator body 21 the hydraulic fluid 5 has a first temperature level T1 and on the side of the partition wall 12 facing away from the stator body 21 the hydraulic fluid 5 has a second temperature level T2. Preferably, the first temperature level T1 is different from the second temperature level T2.

A feed-through element 13 is arranged in the partition wall 12 with the at least one electrical conductor 11 reaching through the feed-through element in such a manner that a hydraulic barrier 14 is formed between the hydraulic fluid 5 on the side of the partition wall 12 facing the stator body 21 and the hydraulic fluid 5 on the side of the partition wall 12 facing away from the stator body 21. In the embodiment shown in FIG. 2, the hydraulic barrier 14 is designed as a seal that rests against the electrical conductor 11 in a contacting manner. The feed-through element 13 is formed from a plastic, in particular an elastomer, and is held in the partition wall 12 by means of a press fit. The feed-through element 13 is of plug-like design with a circumferential collar 15 which rests against the partition wall 12.

Figure 4:
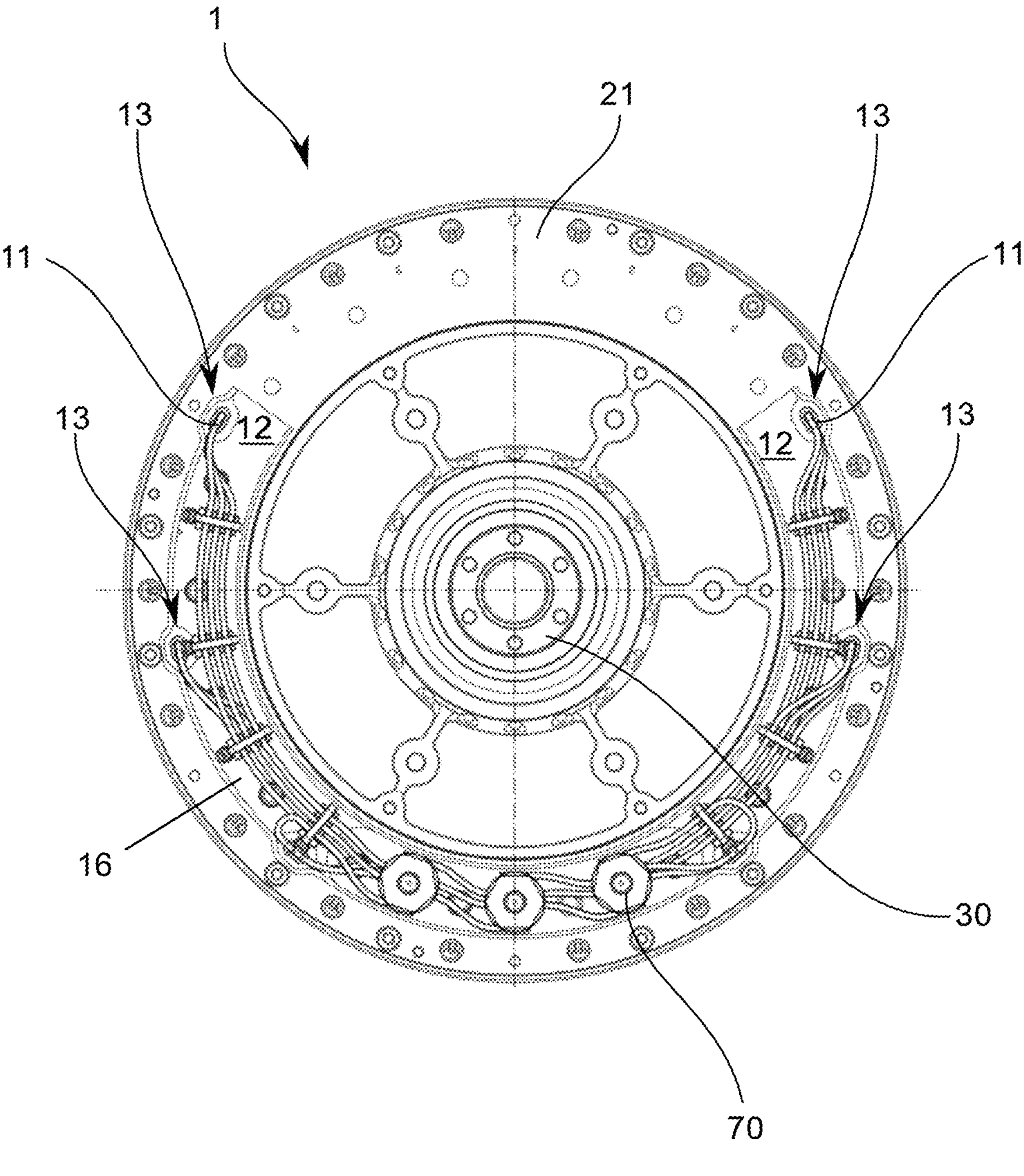
FIG. 4 shows a frontal view of an end face of a stator body.
Figure 5:
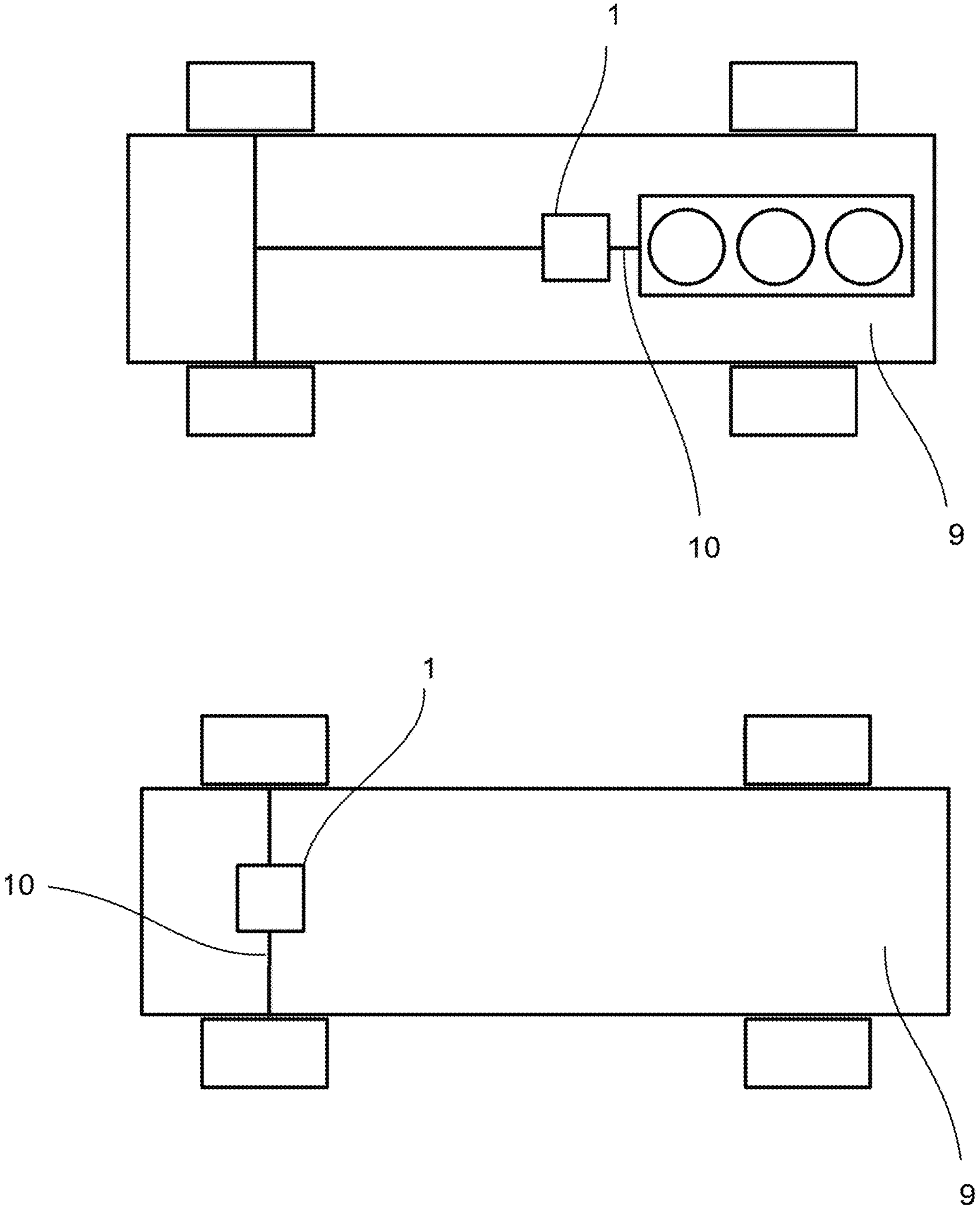
FIG. 5 shows a motor vehicle with an electrical machine in schematic block diagrams.

As can be seen from FIG. 4, the partition wall 12 forms the bottom of a conductor channel 16 in which the conductors 11 are guided in the circumferential direction and over which the hydraulic fluid 5 flows.

The disclosure is not limited to the embodiments shown in the figures. The above description is therefore not to be regarded as limiting, but rather as illustrative. The following claims are to be understood as meaning that a named feature is present in at least one embodiment disclosed herein. This does not exclude the presence of further features. If the patent claims and the above description define 'first' and 'second' features, this designation serves to distinguish between two features of the same type without defining an order of precedence.

LIST OF REFERENCE SYMBOLS

1 Machine
2 Stator
3 Rotor
4 Stator winding
5 Hydraulic fluid
6 Connecting element
7 Conductor
9 Motor vehicle
10 Drive train
11 Conductor
12 Partition wall
13 Feed-through element
14 Barrier
15 Collar
16 Conductor channel
21 Stator body
22 Stator body
30 Rotor shaft
31 Rotor body
32 Dry chamber
41 Stator winding
42 Stator winding
43 Winding ends
44 Winding ends
51 Hydraulic chamber
52 Hydraulic chamber
70 Connection element
71 Contacting body
72 Section
73 Receiving sleeve
81 Seal
82 Seal
91 Housing component
92 Housing component

The invention claimed is:

1. An electrical machine, comprising:

a stator;

a rotor rotatably mounted relative to the stator, the rotor has a rotor shaft with at least one rotor body arranged in a non-rotatable and non-displaceable manner on the rotor shaft;

the stator has a stator body with a first stator winding arranged within a first hydraulic chamber, within which the first stator winding is contactable at least in sections by a hydraulic fluid;

at least one electrical conductor of the first stator winding emerges in an axial direction from the first stator body and extends through a partition wall;

a feed-through element arranged in the partition wall, and the at least one electrical conductor extends through the feed-through element such that a hydraulic barrier is formed between the hydraulic fluid on a side of the partition wall facing the stator body and the hydraulic fluid on a side of the partition wall facing away from the stator body.

2. The electrical machine according to claim 1, wherein the at least one electrical conductor comprises a plurality of electrical conductors that extend through the feed-through element.

3. The electrical machine according to claim 1, wherein the hydraulic barrier comprises a seal.

4. The electrical machine according to claim 1, wherein there are a plurality of the feed-through elements and the at least one electrical conductor comprises a plurality of electrical conductors, and a respective said hydraulic barrier is provided in the feed-through element for each said electrical conductor.

5. The electrical machine according to claim 1, wherein the feed-through element is formed from a plastic.

6. The electrical machine according to claim 1, wherein the feed-through element is held in the partition wall by at least one of a press fit or a form fit.

7. The electrical machine according to claim 1, wherein the feed-through element comprises a plug with a circumferential collar which rests against the partition wall.

8. The electrical machine according to claim 1, wherein the partition wall forms a bottom of a conductor channel in which the at least one conductor is guided in a circumferential direction and over which the hydraulic fluid is adapted to flow.

9. The electrical machine according to claim 1, wherein the electrical machine comprises an axial flux machine, with the rotor rotatably mounted relative to the stator in a dry chamber, the at least one first rotor body is disc-shaped, the stator body is annular disc-shaped and the stator further includes a second annular disc-shaped stator body, the annular disc-shaped stator body and the second annular disc-shaped stator body are arranged coaxially with respect to one another and with respect to the rotor shaft and are axially spaced apart from one another with the rotor located therebetween, and the stator body has the first stator winding and the second stator body has a second stator winding, and the first stator winding is arranged within the first hydraulic chamber and the second stator winding is arranged within a second hydraulic chamber, within which the respective stator windings are each contactable at least in sections by the hydraulic fluid.

10. An electrical machine, comprising:

a stator having a first stator body with a first stator winding arranged within a first hydraulic chamber, and a second stator body with a second stator winding arranged within a second hydraulic chamber, within which the first stator winding and the second stator winding are each contactable at least in sections by a hydraulic fluid;

a rotor rotatably mounted relative to the stator in a dry chamber;

at least one electrical conductor of the first stator winding emerges in an axial direction from the first stator body and extends through a partition wall;

a feed-through element arranged in the partition wall, and the at least one electrical conductor extends through the feed-through element such that a hydraulic barrier is formed between the hydraulic fluid on a side of the partition wall facing the first stator body and the hydraulic fluid on a side of the partition wall facing away from the first stator body.

11. The electrical machine according to claim 10, wherein the at least one electrical conductor comprises a plurality of electrical conductors that extend through the feed-through element.

12. The electrical machine according to claim 10, wherein the hydraulic barrier comprises a seal.

13. The electrical machine according to claim 10, wherein there are a plurality of the feed-through elements and the at least one electrical conductor comprises a plurality of electrical conductors, and a respective said hydraulic barrier is provided in the feed-through element for each said electrical conductor.

14. The electrical machine according to claim 10, wherein the feed-through element is formed from a plastic.

15. The electrical machine according to claim 10, wherein the feed-through element is held in the partition wall by at least one of a press fit or a form fit.

16. The electrical machine according to claim 10, wherein the feed-through element comprises a plug with a circumferential collar which rests against the partition wall.

17. The electrical machine according to claim 10, wherein the partition wall forms a bottom of a conductor channel in which the at least one conductor is guided in a circumferential direction and over which the hydraulic fluid is adapted to flow.

18. The electrical machine according to claim 10, wherein:

the electrical machine comprises an axial flux machine;

the rotor has a rotor shaft with at least one first rotor body that is disc-shaped, the at least one first rotor body is arranged in a non-rotatable and non-displaceable manner on the rotor shaft of the rotor; and the first stator body is annular disc-shaped and the second stator body is annular disc-shaped, wherein the annular disc-shaped first stator body and the annular disc-shaped second stator body are arranged coaxially with respect to one another and with respect to the rotor shaft and are axially spaced apart from one another with the rotor located therebetween.

* * * * *